Figure 1:
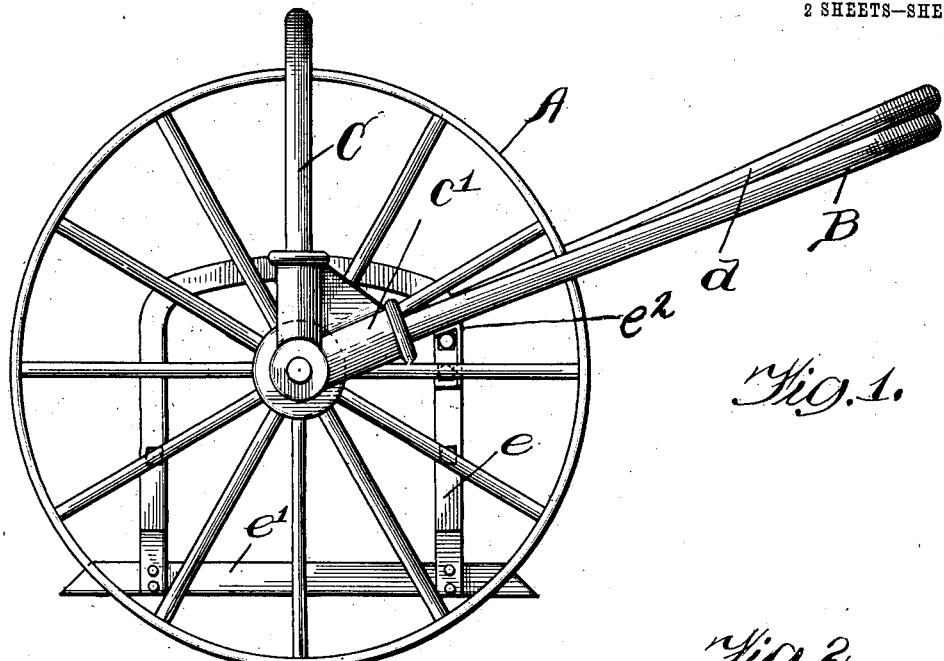

No. 826,779. PATENTED JULY 24, 1906.
J. J. GLEDHILL.
VEHICLE FOR HANDLING BRICK.
APPLICATION FILED JULY 26, 1905.

2 SHEETS—SHEET 1.

Witnesses:
J. B. Weir
G. W. Donard.

Inventor:
J. J. Gledhill
By Bulkley & Durand
Attorneys

No. 826,779. PATENTED JULY 24, 1906.
J. J. GLEDHILL.
VEHICLE FOR HANDLING BRICK.
APPLICATION FILED JULY 26, 1905.

2 SHEETS—SHEET 2.

Witnesses:
Inventor:

UNITED STATES PATENT OFFICE.

JOHN J. GLEDHILL, OF ST. LOUIS, MISSOURI.

VEHICLE FOR HANDLING BRICK.

No. 826,779.　　　　Specification of Letters Patent.　　　　Patented July 24, 1906.

Application filed July 26, 1905. Serial No. 271,298.

*To all whom it may concern:*

Be it known that I, JOHN J. GLEDHILL, a citizen of the United States of America, and a resident of St. Louis, Missouri, have invented a certain new and useful Improvement in Vehicles for Handling Brick, of which the following is a specification.

My invention relates to carts or trucks adapted more particularly for use in connection with the manufacture of brick.

Vehicles of this character consist generally of a suitable body mounted on a suitable number of vehicle-wheels and provided with a platform or supporting structure which can be raised and lowered. In the manufacture of brick, and particularly in the drying process, the bricks are supported on pallets, so that they can be moved from place to place. When it is desired to transfer a pallet of brick from one place to another, a cart or truck is wheeled into position below the same and the structure of the vehicle then manipulated in such manner as to lift the pallet off from its stationary supports. In this way the pallet of brick is easily picked up and loaded onto the cart or truck and can then be wheeled to another position and unloaded with equal facility.

Generally stated, the object of my invention is to provide an improved, simplified, and highly-efficient vehicle for handling or carrying brick.

Special objects of my invention are to provide an improved construction and arrangement whereby the vehicle may consist of a cart having but two wheels and having also a brick-support suspended between said wheels, together with means for easily raising and lowering said support when it is desired to load or unload the brick; to provide an improved construction and arrangement whereby the brick can be supported quite near the floor or ground and whereby it will not be necessary to raise the brick as high as heretofore, thus reducing the amount of labor necessary for raising and lowering and transporting the brick and simplifying and facilitating the operation generally; to provide an improved construction and arrangement whereby the vehicle may consist of a cart having but two wheels and having also a divided brick-support suspended between said wheels, together with means for raising and lowering the said support, the vehicle being thus adapted to have its two wheels positioned at opposite sides of the pallet of brick and to have its divided brick-support then brought into engagement with the opposite sides of the said pallet for the purpose of raising the latter from its comparatively lowdown position of rest; to provide an improved construction and arrangement of cranks and levers and other parts for raising and lowering a pallet of brick when it is desired to load or unload the same, and to provide certain details of construction and features of improvement tending to increase the general efficiency and serviceability of a vehicle of this particular character.

To the foregoing and other useful ends my invention consists in matters hereinafter set forth and claimed.

Figure 2:
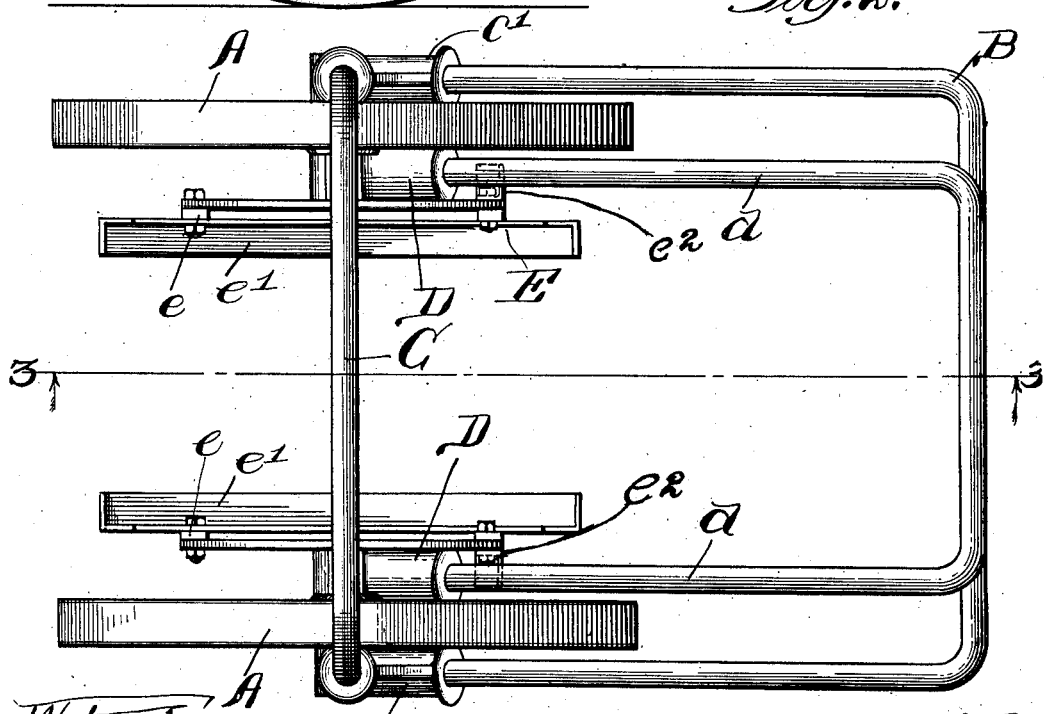
Figure 3:
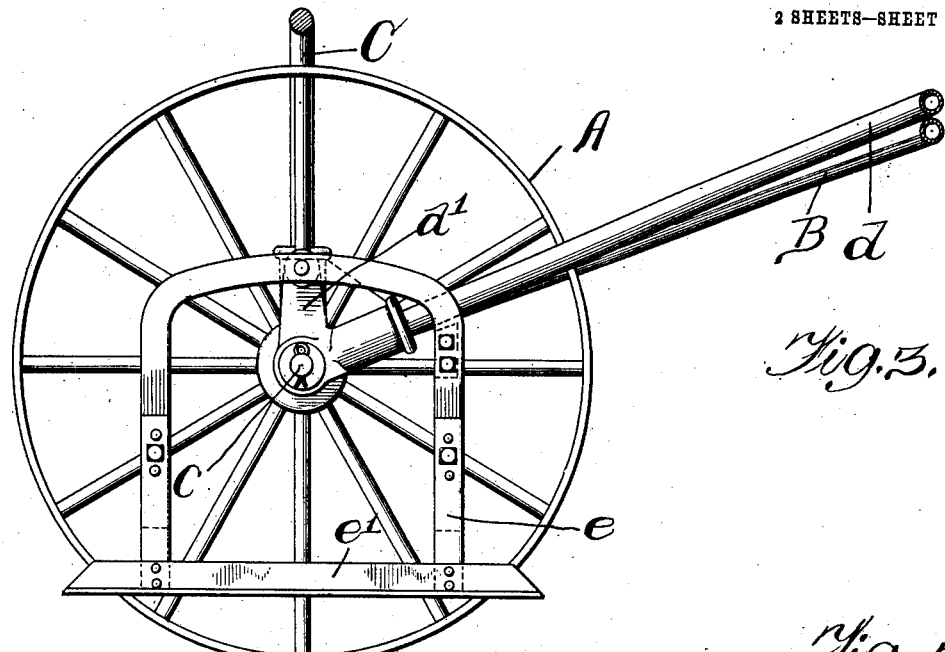
Figure 4:
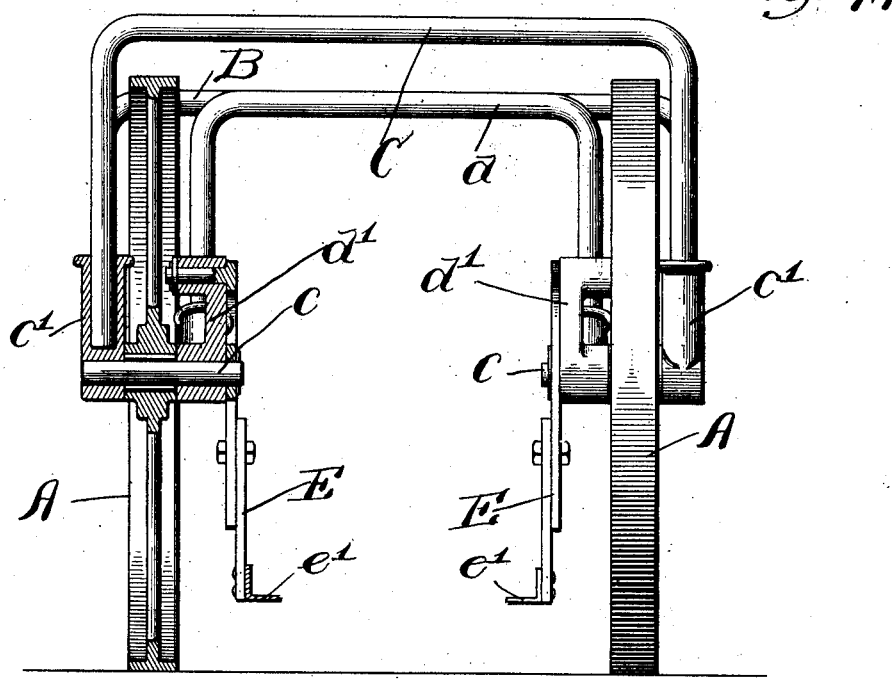

In the accompanying drawings, Figure 1 is a side elevation of my improved vehicle for handling and carrying brick. Fig. 2 is a plan of the two-wheeled cart shown in Fig. 1. Fig. 3 is a longitudinal vertical section on line 3 3 in Fig. 2. Fig. 4 is a view of one end of the said cart, showing one side of the same in vertical section.

As thus illustrated, my improved vehicle is in the nature of a cart having a pair of vehicle-wheels A and a pushing-handle B, the latter being bail-shaped in character; but it will be understood that the said cart may be either pushed or drawn, as may suit the convenience of the operator. The two wheels are connected by an arched and bail-shaped axle C, provided at its ends with horizontally-disposed spindles $c$, upon which are mounted the said wheels. It will be observed that the middle or body portion of this axle is connected with its spindles by means of castings $c'$, and these castings also serve to rigidly unite the said axle with the bail-shaped handle B. Thus the handle is rigidly connected with the axle structure upon which the two wheels are mounted, there being a clear space between the wheels and below the arch-shaped axle. The castings D are designed to serve as bell-cranks and are mounted to turn upon the inner ends of the axle-spindles $c$. Any suitable means can be applied to the ends of said spindles for the purpose of holding both the wheels and the said bell-cranks in place thereon. These two bell-cranks are rigidly united by a bail-shaped handle or operating-lever $d$, this handle or operating-lever being arranged to extend rearwardly as far as the transverse end portion of the handle B. As illustrated, the brick-support comprises two parts or sections E, which are pivotally secured to the upper ends of the arms $d'$ of the said bell-cranks. Preferably, these two sections of the brick-support each consist of a bail-shaped frame or vertical portion $e$, having its lower ends provided with a horizontal and longitudinally-extending piece of angle-iron $e'$, the latter providing a ledge or shelf upon which the pallet of brick may rest. Each bail-shaped member $e$ is desirably composed of sections connected together in such manner that the angle-irons $e'$ can both be raised and lowered for the purpose of adjusting the support with reference to the height at which the pallets of brick may be distributed upon the floor or ground.

It will be seen that the two sections of the brick-support are desirably well balanced upon their pivotal supports, thus insuring at all times a horizontal or level position for each angle-iron $e'$. Obviously, however, each side or section of the brick-support is adapted to adjust itself to the side or edge portion of the pallet of brick and to do so independently of the other section. In this way the cart is adapted to be positioned with its wheels at the opposite sides of the pallet of brick and with the two sections of the brick-support hanging at opposite sides of the said pallet, and then when the brick-support is raised its two sections adjust themselves easily to the sides of the said pallet.

When the cart is brought into position for loading a pallet of brick, the handle $d$ is at such time allowed to remain in a vertical position and in contact with the arched or bail-shaped axle C, thus permitting the ledges or angle-irons $e'$ of the brick-support to hang as low down as possible. However, according to the character of the work, it may be only necessary for the operator to slightly separate the two handles B and $d$, so as to slightly lower the brick-support; but in any event the brick-support is lowered and the cart then wheeled over the pallet of brick for the purpose of bringing the two ledges of the brick-support beneath the said pallet. When this has been done, the operator then pulls down on the handle $d$ and in this way raises the pallet of brick from its support or resting-place. The two handles can then be held tightly together while the cart is being wheeled to the place where it is desired to unload the pallet of brick. Obviously with this construction and arrangement it is not necessary to raise the bricks very high or to have them supported on high supporting structures. This I find is in many ways quite advantageous and quite an improvement over the old method. While the brick is being carried by the cart, the handle $d$ can be prevented from rising by simply lowering both of the handles to a more or less horizontal position, so as to bring the axis or pivotal points of the brick-support past the center and at such a position that the mere weight of the brick tends in itself to hold the handle $d$ against rising. When said axis is thrown to the other side of the center, it is obvious that the weight of the brick-support and its load of brick will then cause it to move downward.

The lugs or stop devices $e^2$ are secured to the sides of the bail-shaped members E and are adapted to engage the under surfaces of the side portions of the handle $d$. In this way these lugs prevent the brick-support and the pallet of brick from swinging while the vehicle is in motion and to permit the handles to be lowered for the purpose of tilting up the forward end of the brick-support. This is particularly an advantage when the cart is pushed up an incline or when for any other reason it is necessary to raise the other end of the pallet of brick being carried by the ledges $e'$.

What I claim as my invention is—

1. A vehicle for carrying brick, comprising an arched or bail-shaped axle having its ends provided with inwardly-projecting spindles, wheels mounted on said spindles, raising and lowering devices also mounted on said spindles, a brick-support hung on said raising and lowering devices, and means for operating said raising and lowering devices.

2. A vehicle for carrying brick, comprising an axle having an upper horizontal portion and upright side portions, inwardly-projecting spindles secured to the lower ends of said upright portions, wheels mounted on said spindles, a brick-supporting device pivotally mounted on each bell-crank, a bail-shaped handle rigidly secured to said axle, and another bail-shaped handle rigidly secured to said bell-cranks, whereby the said bell-cranks may be rocked on said spindles for the purpose of raising and lowering said brick-supporting devices.

3. A vehicle for carrying brick, comprising an axle having an upper horizontal portion, upright side portions, vehicle-wheels carried by the lower ends of said upright portions, raising and lowering means also carried by the lower ends of said upright portions, a brick-support carried by said raising and lowering means, a handle rigid with said axle, and another handle rigid with said raising and lowering means, said brick-support being positioned between said wheels.

4. A vehicle for carrying brick, comprising a swinging brick-support, a bail-shaped handle, and lugs carried by the brick-support and adapted to engage the said handle.

5. A vehicle for carrying brick, comprising a brick-support pivotally mounted at its upper end, side members, and lugs carried by said brick-support and adapted to engage said members.

6. A vehicle for carrying brick, comprising an axle having an upper horizontal portion, upright side portions, vehicle-wheels carried by the lower ends of said upright portions, raising and lowering means also carried by the lower ends of said upright portions, a brick-support carried by said raising and lowering means, a handle connected with said axle, and another handle connected with said raising and lowering means, said brick-support being positioned between said wheels.

Signed by me at St. Louis, Missouri, this 21st day of July, 1905.

JOHN J. GLEDHILL.

Witnesses:
E. L. HESS,
H. D. LEMPKE.